(12) United States Patent
Kim et al.

(10) Patent No.: US 11,545,060 B2
(45) Date of Patent: Jan. 3, 2023

(54) DISPLAY DEVICE

(71) Applicant: Samsung Display Co., Ltd., Yongin-si (KR)

(72) Inventors: Soon Dong Kim, Yongin-si (KR); Joon Chul Goh, Yongin-si (KR); Bong Hyun You, Yongin-si (KR); Byung Ki Chun, Yongin-si (KR); Seong Heon Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/118,188

(22) Filed: Dec. 10, 2020

(65) Prior Publication Data

US 2021/0319733 A1 Oct. 14, 2021

(30) Foreign Application Priority Data

Apr. 8, 2020 (KR) .................. 10-2020-0042988

(51) Int. Cl.
*G09G 5/06* (2006.01)
*G09G 3/00* (2006.01)

(52) U.S. Cl.
CPC .............. *G09G 3/035* (2020.08); *G09G 5/06* (2013.01); *G09G 2320/0673* (2013.01); *G09G 2380/02* (2013.01)

(58) Field of Classification Search
CPC .. G09G 3/035; G09G 5/06; G09G 2320/0673; G09G 2380/02
See application file for complete search history.

(56) References Cited

U.S. PATENT DOCUMENTS

| 9,912,967 | B2 | 3/2018 | Ikeda et al. | |
| 2009/0174638 | A1* | 7/2009 | Brown Elliott | G09G 3/2081 345/88 |
| 2021/0027700 | A1 | 1/2021 | Chun et al. | |
| 2021/0201813 | A1* | 7/2021 | Oh | G09G 3/3233 |

FOREIGN PATENT DOCUMENTS

| KR | 10-2117800 B1 | 6/2020 |
| KR | 10-2021-0013485 A | 2/2021 |

* cited by examiner

*Primary Examiner* — Robert J Michaud
(74) *Attorney, Agent, or Firm* — Lewis Roca Rothgerber Christie LLP

(57) ABSTRACT

A display device includes: a plurality of pixels; a first pixel unit comprising a first portion of the plurality of pixels; a second pixel unit comprising a second portion of the plurality of pixels; and a data driver configured to supply a data voltage to the first pixel unit and the second pixel unit, wherein the data driver is configured to generate a data voltage to be supplied to the first pixel unit based on different gamma voltages even when the same grayscale is expressed according to a driving method, and the second pixel unit is configured to be driven or not driven according to the driving method.

20 Claims, 14 Drawing Sheets

DISPLAY DEVICE

CROSS-REFERENCE TO RELATED APPLICATION

This application claims priority to and the benefit of Korean Patent Application No. 10-2020-0042988, filed on Apr. 8, 2020, the disclosure of which is incorporated by reference herein in its entirety.

BACKGROUND

1. Field

Aspects of some example embodiments of the present disclosure relate to a display device.

2. Discussion of the Related Art

As the information society has developed, a demand for display devices for displaying images has increased in various forms, and in recent years, various flat panel display devices such as liquid crystal displays, plasma display devices, organic light emitting diode display devices, and electrophoretic display devices are utilized. For example, because liquid crystal display devices, organic light emitting display devices, and electrophoretic display devices may be relatively thin, research for implementing them as flexible display devices having flexibility has been conducted.

When a display device continuously outputs a specific image or text for a long period of time as a driving time is long, individual pixels may deteriorate, and the deteriorated pixels may be recognized or perceived by users.

The above information disclosed in this Background section is only for enhancement of understanding of the background and therefore the information discussed in this Background section does not necessarily constitute prior art.

SUMMARY

Aspects of some example embodiments include a display device that is driven according to an entire driving method (or entire driving mode) in which pixels in the entire display area are driving and a partial driving method (or partial driving mode) in which only pixels positioned in a portion of the display area are driven.

Aspects of some example embodiments may include a foldable display device that is driven according to the entire driving method in an un-folding state and is driven according to the partial driving method in a folding state.

Aspects of some example embodiments include a display device in which recognition of a boundary between areas is minimized or reduced when the display device is driven according to the partial driving method and then is driven according to the entire driving method.

The characteristics of embodiments according to the present disclosure are not limited to the characteristics described above, however, and other technical characteristics that are not described will be more clearly understood by those skilled in the art from the following description.

A display device according to some example embodiments comprises a plurality of pixels. The display device comprises a first pixel unit comprising a portion of the plurality of pixels, a second pixel unit comprising another portion of the plurality of pixels, and a data driver configured to supply a data voltage to the first pixel unit and the second pixel unit. The data driver generates a data voltage supplied to the first pixel unit based on different gamma voltages even when the same grayscale is expressed according to a driving method, and the second pixel unit is driven or not driven according to the driving method.

According to some example embodiments, the data voltage supplied to the first pixel unit may be generated based on gamma voltages different respectively when the second pixel unit is driven and when the second pixel unit is not driven.

According to some example embodiments, the driving method may comprise an entire driving that drives both of the first pixel unit and the second pixel unit, and a partial driving that drives the first pixel unit and does not drive the second pixel unit.

According to some example embodiments, the display device may be a foldable display device, the entire driving may be performed in an un-folding state, and the partial driving may be performed in a folding state.

According to some example embodiments, the display device may comprise a bending area that is bent in the folding state, and a first non-bending area and a second non-bending area that are not bent with the bending area interposed between the first non-bending area and the second non-bending area.

According to some example embodiments, the first pixel unit may comprise pixels located in the first non-bending area, and the second pixel unit may comprise pixels located in the second non-bending area.

According to some example embodiments, the first pixel unit may further comprise pixels located in the bending area.

According to some example embodiments, the display device may further comprise a gamma voltage generator configured to provide the gamma voltage to the data driver, and a power supply configured to provide a plurality of voltage signals to the gamma voltage generator.

According to some example embodiments, the display device may further comprise a first switch element connected between the power supply and one input terminal of the gamma voltage generator, and a second switch element connected between the power supply and another input terminal of the gamma voltage generator.

According to some example embodiments, the first switch element may selectively provide a first high reference voltage and a second high reference voltage to the gamma voltage generator from the power supply, the second switch element may selectively provide a first low reference voltage and a second low reference voltage to the gamma voltage generator from the power supply, and the gamma voltage generator may output a gamma voltage having a voltage between the first high reference voltage and the first low reference voltage or output a gamma voltage having a voltage between the second high reference voltage and the second low reference voltage according to the driving method.

According to some example embodiments, the gamma voltage generator may output the gamma voltage having the voltage between the first high reference voltage and the first low reference voltage when the second pixel unit is driven, and may output the gamma voltage having the voltage between the second high reference voltage and the second low reference voltage when the second pixel unit is not driven, the second high reference voltage may be different from the first high reference voltage, and the second low reference voltage may be different from the first low reference voltage.

According to some example embodiments, the display device may further comprise a first look-up table and a second look-up table in which a compensation grayscale is set, and the gamma voltage generator may generate the gamma voltage by referring to the first look-up table or the second look-up table according to the driving method.

According to some example embodiments, the gamma voltage generator may generate the gamma voltage by referring to the first look-up table when the second pixel unit is driven, and may generate the gamma voltage by referring to the second look-up table when the second pixel unit is not driven.

According to some example embodiments, the display device may comprise a display area in which an image is displayed, and a non-display area in which the image is not displayed, the display area may comprise a foldable area positioned in a bent area, and a first flat area and a second flat area that are not bent with the foldable area interposed between the first flat area and the second flat area, and the foldable area may comprise a plurality of sub areas in which a luminance of pixels set to express the same grayscale is differently set according to the driving method.

According to some example embodiments, pixels of different colors may be positioned in one sub area among the plurality of sub areas, and the pixels of the different colors may comprise pixels in which a luminance is differently set.

A foldable display device according to some example embodiments includes a first pixel unit that is driven in both of an un-folding state and a folding state, a second pixel unit that is driven in the un-folding state and that is not driven in the folding state, and a data driver configured to provide a data voltage to the first pixel unit and the second pixel unit. The data driver generates a data voltage provided to the first pixel unit, based on a gamma voltage different according to the un-folding state or the folding state.

According to some example embodiments, the data driver may provide the data voltage to the second pixel unit in the un-folding state, and may not provide the data voltage to the second pixel unit in the folding state.

According to some example embodiments, the foldable display device may further comprise a gamma voltage generator configured to generate the gamma voltage provided to the data driver, and the gamma voltage generator may generate the gamma voltage by receiving a reference voltage different according to the un-folding state or the folding state.

A display device according to some example embodiments includes a bending area that is bent in a folded state, and a first non-bending area and a second non-bending area that are not bent with the bending area interposed between the first non-bending area and the second non-bending area. The display device comprises a first pixel unit that is driven in both of an un-folding state and the folding state, and a second pixel unit that is driven in the un-folding state and that is not driven in the folding state. The first pixel unit comprises a plurality of pixels positioned in the bending area, and the plurality of pixels comprise pixels in which a luminance is differently set in the folding state.

According to some example embodiments, the plurality of pixels may comprise a first color pixel and a second color pixel, and the luminance of the first color pixel and the second color pixel may be differently set in the folding state.

Further details of some example embodiments are described in more detail below in the detailed description and drawings.

According to some example embodiments of the disclosure, when the display device is driven according to the partial driving method and then is driven according to the entire driving method, recognition of a boundary between areas to a user may be minimized or reduced.

In addition, when the display device is driven according to the partial driving method and then is driven according to the entire driving method, a color difference according to an angle may be improved while minimizing or reducing recognition of an afterimage between the areas to the user.

In addition, power consumption of the display device may be reduced.

The characteristics of embodiments according to the present disclosure are not limited by the contents described above, and more various effects are illustrated and described in the present specification.

BRIEF DESCRIPTION OF THE DRAWINGS

The above and other features of embodiments according to the present disclosure will become more apparent by describing in further detail aspects of some example embodiments thereof with reference to the accompanying drawings, in which.

DETAILED DESCRIPTION

Figure 1:
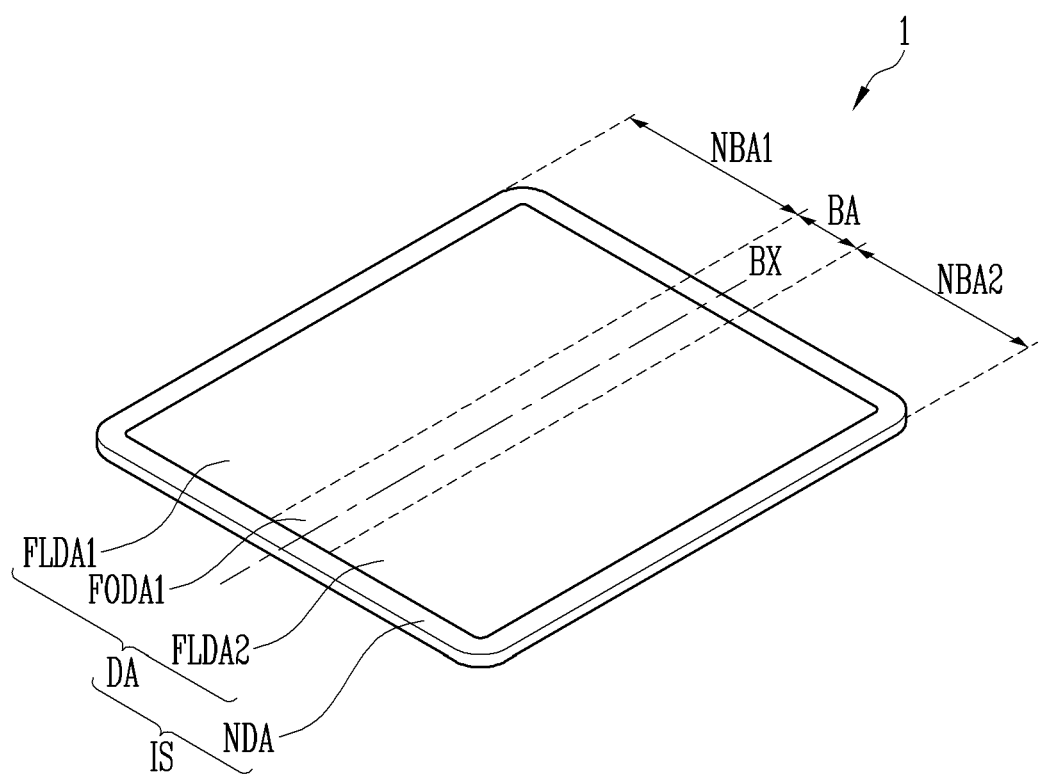
FIG. 1 is a perspective view illustrating one state of a display device according to some example embodiments of the present disclosure.

Various characteristics and features of embodiments according to the present disclosure and a method of achieving them will become more apparent with reference to the example embodiments described in more detail below together with the accompanying drawings. However, embodiments according to the present disclosure are not limited to the example embodiments disclosed below, and may be implemented in various different forms. The present example embodiments are provided so that the disclosure will be more thorough and more complete and those skilled in the art to which the disclosure pertains can more fully understand the scope of the disclosure. The disclosure is only defined by the scope of the claims and their equivalents.

Although a first, a second, and the like are used to describe various components, these components are not limited by these terms. These terms are used only to distinguish one component from another component. Therefore, a first component mentioned below may be a second component within the technical spirit of the disclosure. Singular expressions comprise plural expressions unless the context clearly indicates otherwise.

Hereinafter, aspects of some example embodiments of the present disclosure will be described in more detail with reference to the accompanying drawings. The same or similar reference numerals are used for the same components in the drawings.

Figure 2:
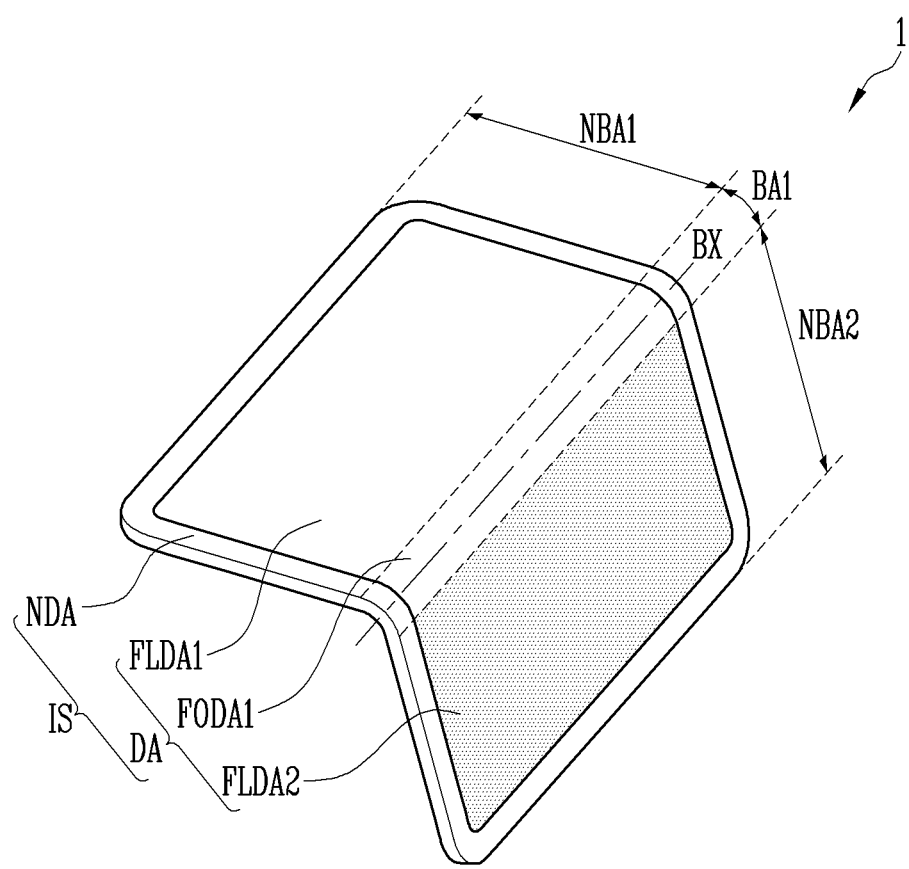
FIG. 2 is a perspective view illustrating another state of the display device according to some example embodiments of the present disclosure.

FIG. 1 is a perspective view illustrating one state of a display device according to some example embodiments of the present disclosure. FIG. 2 is a perspective view illustrating another state of the display device according to some example embodiments of the present disclosure.

Referring to FIGS. 1 and 2, according to some example embodiments, the display device 1 may be a flexible display device 1. For example, the display device 1 may be a foldable display device 1 that may be bent or unfolded. FIG. 1 shows a state in which the display device 1 is unfolded (un-folding state), and FIG. 2 shows a state in which the display device 1 is partially bent.

However, the display device 1 is not limited to the shown shape, and the spirit of the disclosure may be applied to the display device 1 as long as the display device 1 comprises a portion in which a tensile force or a compressive force is generated by bending (or folding). That is, the spirit of the disclosure may be applied to the display device 1 that may be simply bent and the rollable display device.

Hereinafter, an organic light emitting display device as the display device 1 will be described as an example. However, embodiments according to the disclosure are not limited thereto, and the disclosure may be applied to various display devices such as a liquid crystal display device, a field emission display device, an electrophoretic display device, a quantum dot light emitting display device, or a micro (or nano) LED display device 1 unless the display device 1 change the spirit of the disclosure.

In addition, hereinafter, the display device 1 is described based on a power-on state or a display-on state.

The display device 1 comprises a display surface IS on which an image is displayed. The display surface IS may comprise a display area DA in which the image is displayed and a non-display area NDA adjacent to the display area DA.

The display area DA is defined by pixels, and may comprise a plurality of light emitting areas, which are areas respectively emitting light of a color (e.g., a s predetermined color. In addition, the display area DA may be used as a detection member for detecting an external environment (for example, touch).

The non-display area NDA is an area in which an image is not displayed. The display area DA may have a quadrangular shape. The non-display area NDA may be located to surround the display area DA on a plane. In addition, according to some example embodiments, a speaker module, a camera module, a sensor module, and the like may be located in the non-display area NDA, but they may not be located. Here, the sensor module may comprise at least one of an illuminance sensor, a proximity sensor, an infrared sensor, an ultrasonic sensor, or a visual field sensor.

However, embodiments according to the present disclosure are not limited thereto, and a shape of the display area DA and a shape of the non-display area NDA may be relatively designed.

The display device 1 may be bent on the basis of a virtual bending axis BX. According to some example embodiments, when the display device 1 is bent, the display device 1 may comprise a bending area BA which is an actually bent area, a first non-bending area NBA1 and a second non-bending area NBA2 that are not bent. According to some example embodiments, when the display device 1 is bent on the basis of the bending axis BX, the display device 1 may be completely out-folded so that the display surface IS goes outward.

According to some example embodiments, a case in which one bending area BA and two non-bending areas NBA1 and NBA2 are comprised is shown, but the disclosure is not limited thereto. According to some example embodiments, the display device 1 may comprise a plurality of bending areas and three or more non-bending areas.

According to some example embodiments, the first non-bending area NBA1 and the second non-bending area NBA2 may be positioned with the bending area BA interposed therebetween. In the display device 1, the bending area BA and the two non-bending areas NBA1 and NBA2 may be connected and positioned.

The display area DA may comprise a first flat area FLDA1 positioned in the first non-bending area NBA1 that is flat even in the out-folding state, a first foldable area FODA1 positioned in the bending area BA that is bent, and a second flat area FLDA2 positioned in the second non-bending area NBA2 that is flat. As an embodiment, the first flat area FLDA1, the first foldable area FODA1, and the second flat area FLDA2 may be positioned to be connected to form one display area DA.

According to some example embodiments, the display device 1 may be driven in an entire driving method (hereinafter, an entire driving or an entire driving mode) in which all pixels comprised in the display area DA are driven in the unfolded state (unfolding state), and may be driven in a partial driving method (hereinafter, a partial driving or a partial driving mode) in which only pixels comprised in some of the first flat area FLDA1, the first foldable area FODA1, and the second flat area FLDA2 are driven. For example, when the display device 1 is entirely driven, all pixels comprised in the first flat area FLDA1, the first foldable area FODA1, and the second flat area FLDA2 may be driven, and when the display device 1 is partial driven, only pixels comprised in first flat area FLDA1 and the first foldable area FODA1 may be driven.

In a state in which the display device 1 is completely out-folded, when a user has a line of sight direction looking at the first flat area FLDA1, the first flat area FLDA1 and the first foldable area FODA1 may be recognized to the user, however, the second flat area FLDA2 may be hidden by the first flat area FLDA1 and the first foldable area FODA1 and may not be recognized to the user. For this reason, even though the pixels comprised in the second flat area FLDA2 are not driven (that is, partially driven) in the state in which the display device 1 is completely out-folded based on the user, an effect thereof may have substantially the same effect as driving all pixels comprised in the first flat area FLDA1, the first foldable area FODA1, and the second flat area FLDA2 (that is, the entire driving).

Meanwhile, in a state in which the display device 1 is completely out-folded based on the display device 1, when the pixels comprised in the second flat area FLDA2 are not driven (that is, partially driven), power consumption may be reduced while giving substantially the same effect to the user compared to driving all pixels comprised in the first flat area FLDA1, the first foldable area FODA1, and the second flat area FLDA2 (that is, the entire driving) in the out-folded state.

Figure 3:
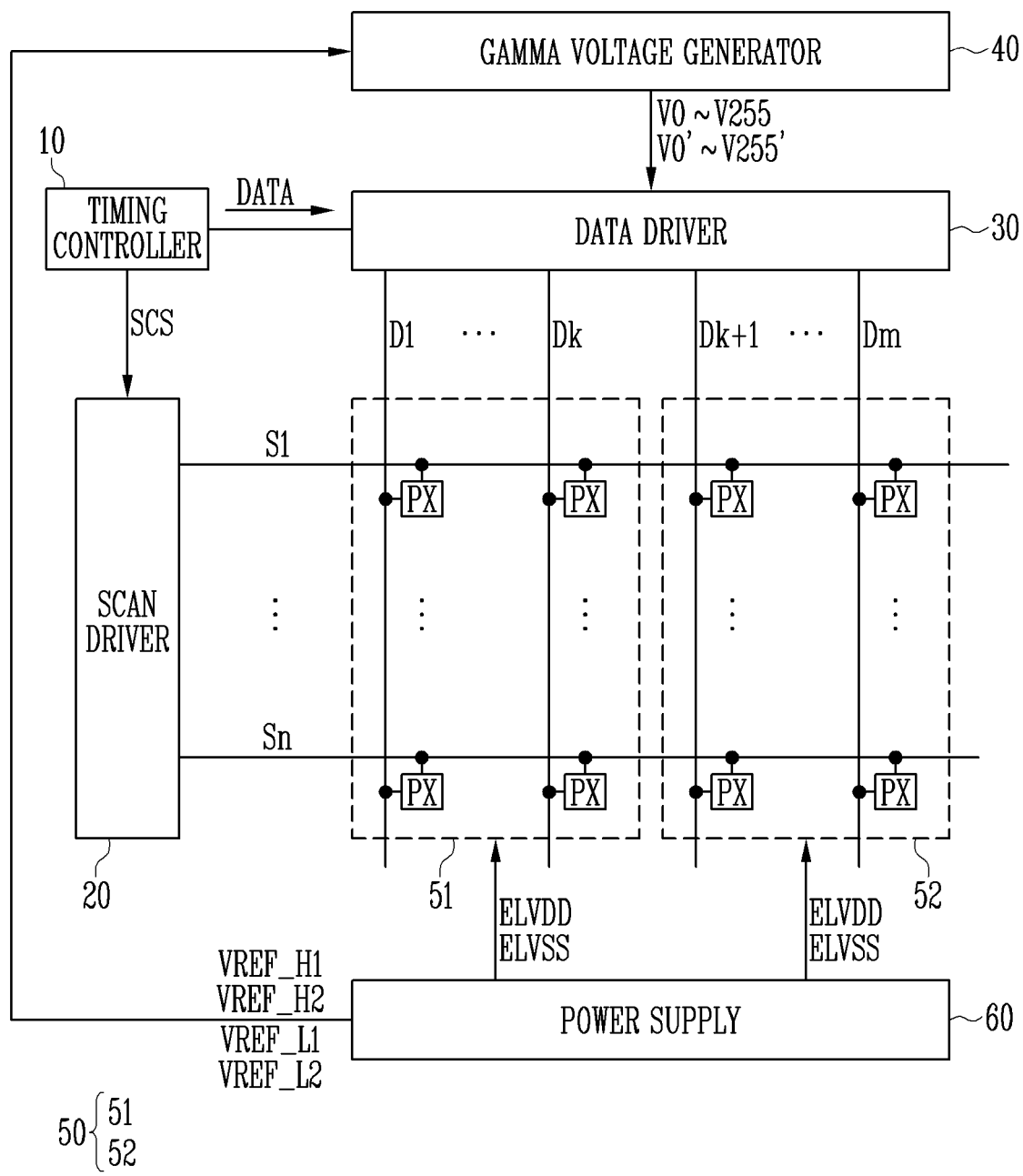
FIG. 3 is a block diagram schematically illustrating the display device according to some example embodiments of the present disclosure.

FIG. 3 is a block diagram schematically illustrating the display device according to some example embodiments of the present disclosure.

Referring to FIG. 3, the display device 1 may comprise a timing controller 10, a scan driver 20, a data driver 30, a gamma voltage generator 40, a pixel unit 50, and a power supply 60.

The timing controller 10 may provide data values DATA, a control signal, and the like for each frame to the data driver 30. In addition, the timing controller 10 may provide a clock signal, a control signal, and the like to the scan driver 20.

The data driver 30 may generate data voltages to be provided to data lines D1 to Dk and Dk+1 to Dm, by using the data values DATA the control signal received from the timing controller 10, gamma voltages V0 to V255 and V0' to V255' received from the gamma voltage generator 40, and the like. Here, m is a natural number, and k is a natural number less than m. For example, the data driver 30 may sample the gamma voltages using a clock signal, and may apply the data voltages to the data lines D1 to Dk and Dk+1 to Dm in a pixel row unit (for example, pixels connected to the same scan line) corresponding to the gamma voltages.

The scan driver 20 may receive the clock signal, a scan start signal, and the like from the timing controller 10 and generate scan signals to be provided to scan lines S1 to Sn. Here, n is a natural number.

The gamma voltage generator 40 may generate a plurality of gamma voltages V0 to V255 and V0' to V255'. In addition, the gamma voltage generator 40 may supply the plurality of gamma voltages V0 to V255 and V0' to V255' to the data driver 30. Accordingly, the data driver 30 may generate the data voltage corresponding to the data value DATA using the gamma voltages V0 to V255 and V0' to V255'.

The pixel unit 50 comprises a plurality of pixels PX. The pixels PX may be connected to corresponding data lines and scan lines, respectively. As an embodiment, the pixels PX may be a red pixel that emit red light, a blue pixel that emit blue light, or a green pixel that emit green light, respectively. In another embodiment, the pixels PX may be white, cyan, magenta, and yellow pixels instead of the red, green, and blue pixels.

The pixel unit 50 may comprise a first pixel unit 51 that maintains a driving state even when a driving method of the display device 1 is changed, and a second pixel unit 52 of which a driving state is changed according to a change of the driving method. For example, the pixels PX comprised in the first pixel unit 51 may be the pixels PX comprised in the first flat area FLDA1 and the first foldable area FODA1 described above, and the pixels PX comprised in the second pixel unit 52 may be the pixels PX comprised in the second flat area FLDA2. Each of the pixels PX comprised in the first pixel unit 51 may be connected to one of the data lines D1 to Dk and one of the scan lines S1 to Sn, and each of the pixels PX comprised in the second pixel unit 52 may be connected to one of the data lines Dk+1 to Dm and one of the scan lines S1 to Sn.

According to some example embodiments, when the display device 1 is entirely driven, the data voltage may be provided to both of the first pixel unit 51 and the second pixel unit 52. When the display device 1 is partially driven, the data voltage may be provided to the first pixel unit 51, but the data voltage may not be provided to the second pixel unit 52. However, this is only one example for the display device 1 to perform the partial driving, and various driving methods may be used to perform the partial driving.

The power supply 60 may receive an external input voltage and convert the external input voltage to provide a power voltage to an output terminal. For example, the power supply 60 generates a high power voltage ELVDD, a low power voltage ELVSS, a first high reference voltage VREF_H1, a first low reference voltage VREF_L1, a second high reference voltage VREF_H2, and a second low reference voltage VREF_L2, based on the external input voltage. Here, the high power voltage ELVDD and the low power voltage ELVSS are power having a voltage level relative to each other, and each of the high reference voltages VREF_H1 and VREF_H2 and each of the low reference voltages VREF_L1 and VREF_L2 may be power having a voltage level relative to each other.

The power supply 60 may provide the high power voltage ELVDD and the low power voltage ELVSS to the pixel unit 50, and may provide the first high reference voltage VREF_H1, the second high reference voltage VREF_H2, the first low reference voltage VREF_L1, and the second low reference voltage VREF_L2 to the gamma voltage generator 40.

The power supply 60 may receive the external input voltage from a battery or the like, and boost the external input voltage to generate a power voltage that is higher than the external input voltage. For example, the power supply 60 may be configured of a power management integrated chip (PMIC). For example, the power supply 60 may be configured of an external DC/DC IC. As another example, the power supply 60 may be configured of a timing controller embedded DDI (TED).

Figure 4:
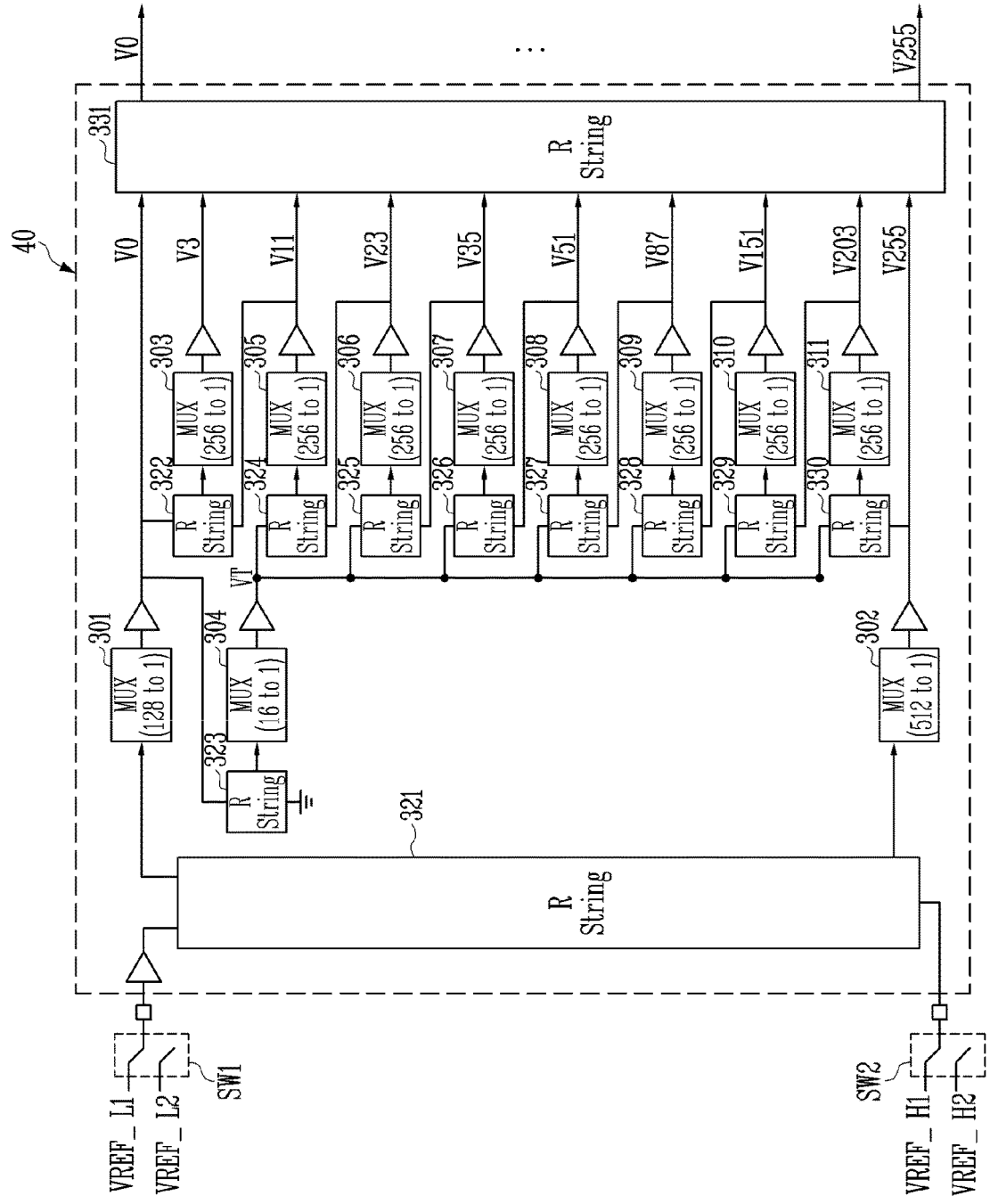
FIG. 4 is a block diagram schematically illustrating one state of a gamma voltage generator according to some example embodiments of the present disclosure.
Figure 5:
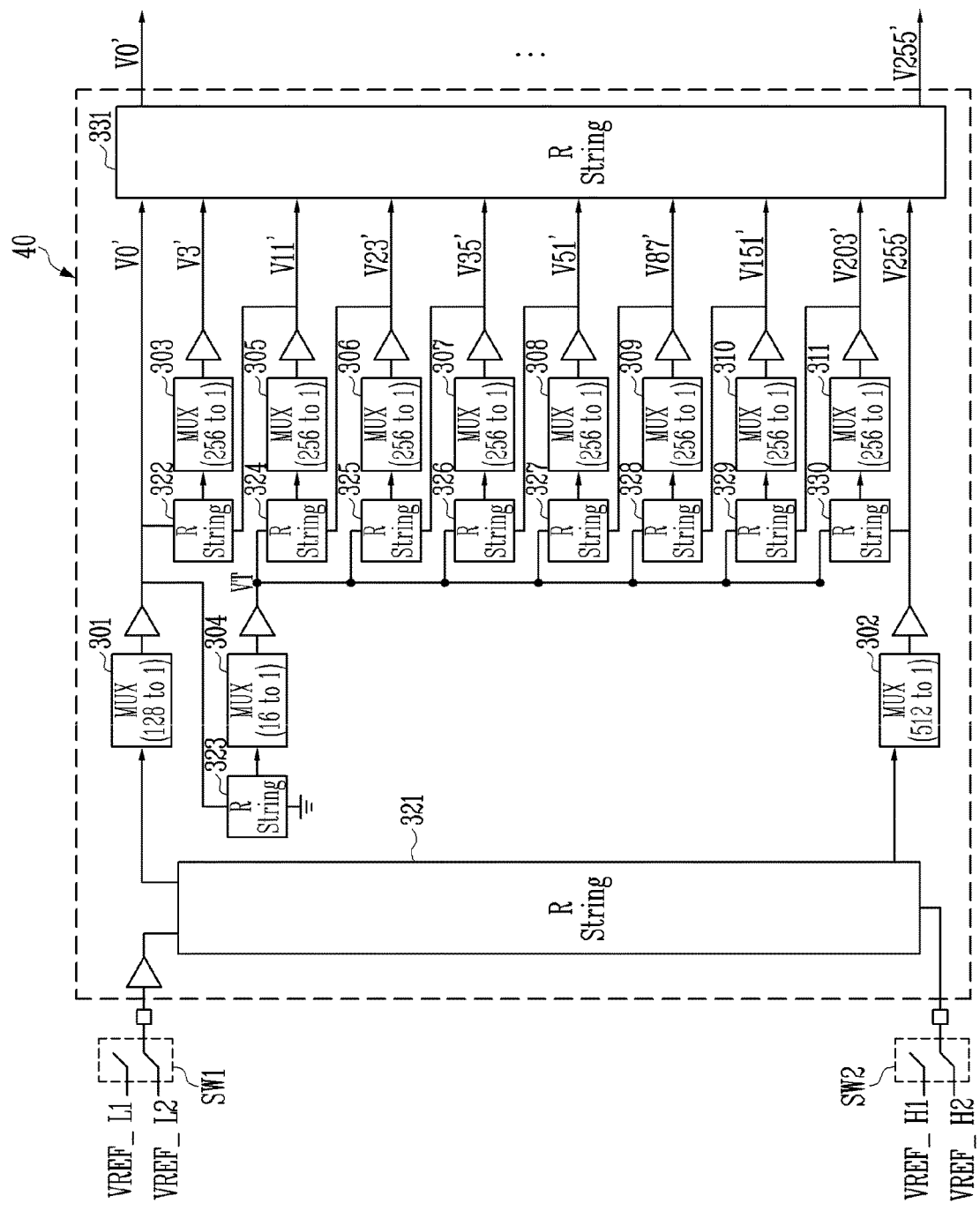
FIG. 5 is a block diagram schematically illustrating another state of the gamma voltage generator according to some example embodiments of the present disclosure.

FIG. 4 is a block diagram schematically illustrating one state of the gamma voltage generator according to some example embodiments of the present disclosure. FIG. 5 is a block diagram schematically illustrating another state of the gamma voltage generator according to some example embodiments of the present disclosure. FIG. 4 shows a connection relationship between the gamma voltage generator 40 and the power supply 60 when the display device 1 is entirely driven, and FIG. 5 shows the connection relationship between the gamma voltage generator 40 and the power supply 60 when the display device 1 is partially driven.

Referring to FIGS. 4 and 5, the gamma voltage generator 40 according to an embodiment of the disclosure may comprise a plurality of multiplexers 301 to 311 and a plurality of resistor strings 321 to 331.

According to some example embodiments, the display device 1 may comprise a plurality of switch elements SW1 and SW2 located between the gamma voltage generator 40 and the power supply 60. The plurality of switch elements SW1 and SW2 may comprise a first switch element SW1 connected to one input terminal of the gamma voltage generator 40 and a second switch element SW2 connected to another input terminal. That is, the first switch element SW1 may be connected between the power supply 60 and one input terminal of the gamma voltage generator 40, and the second switch element SW2 may be connected between the power supply 60 and another input terminal of the gamma voltage generator 40.

The first switch element SW1 may receive the first low reference voltage VREF_L1 and the second low reference voltage VREF_L2 that are relatively low voltages from the power supply 60, and selectively provide the first low reference voltage VREF_L1 and the second low reference voltage VREF_L2 to a first resistor string 321 of the gamma voltage generator 40. The first low reference voltage VREF_L1 and the second low reference voltage VREF_L2 may have different voltage levels. According to some example embodiments, the first switch element may selectively receive the first low reference voltage VREF_L1 from a power driver to provide the first low reference voltage VREF_L1 to the first resistor string 321 when the display device 1 is entirely driven, and may selectively receive the second low reference voltage VREF_L2 from the power driver to provide the second low reference voltage VREF_L2 to the first resistor string 321 when the display device 1 is partially driven. According to some example embodiments, the second low reference voltage VREF_L2 may be greater than the first low reference voltage VREF_L1 based on an absolute value, but embodiments according to the present disclosure are not limited thereto.

The second switch element SW2 may receive the first high reference voltage VREF_H1 and the second high reference voltage VREF_H2 that are relatively high voltages from the power supply 60, and selectively provide the first high reference voltage VREF_H1 and the second high reference voltage VREF_H2 to the first resistor string 321 of the gamma voltage generator 40. The first high reference voltage VREF_H1 and the second high reference voltage VREF_H2 may have different voltage levels. According to some example embodiments, the first switch element may selectively receive the first high reference voltage VREF_H1 from the power driver to provide the first high reference voltage VREF_H1 to the first resistor string 321 when the display device 1 is entirely driven, and may selectively receive the second high reference voltage VREF_H2 from the power driver to provide the second high reference voltage VREF_H2 to the first resistor string 321 when the display device 1 is partially driven.

According to some example embodiments, the second high reference voltage VREF_H2 may be greater than the first high reference voltage VREF_H1 and the second low reference voltage VREF_L2 may be greater than the first low reference voltage VREF_L1 based on an absolute value. However, the disclosure is limited to a size relationship between the first high reference voltage VREF_H1 and the second high reference voltage VREF_H2 and a size relationship between the first low reference voltage VREF_L1 and the second low reference voltage VREF_L2. The size relationship between the first high reference voltage VREF_H1 and the second high reference voltage VREF_H2 and size relationship between the first low reference voltage VREF_L1 and the second low reference voltage VREF_L2 may vary according to whether a driving transistor in the pixel is an N-type or a P-type.

First, the gamma voltage generator 40 will be described based on that the display device 1 is driven in the entire driving method. In addition, an example in which the display device 1 has an 8-bit grayscale or color depth will be described.

A first resistor string 321 may receive the first high reference voltage VREF_H1 from the second switch element SW2 and the first low reference voltage VREF_L1 from the first switch element SW1, and may generate intermediate voltages between the first high reference voltage VREF_H1 and the first low reference voltage VREF_L1.

According to some example embodiments, a buffer or an amplifier may be located between the first switch element SW1 and the first resistor string 321. In addition, a buffer or an amplifier may be located at an output terminal of each multiplexer described below.

A first multiplexer 301 may select any one of a plurality of intermediate voltages output from the first resistor string 321 and output the selected intermediate voltage. The first multiplexer 301 may output the selected intermediate voltage as a 0th gamma voltage V0, or may output the selected intermediate voltage to a second resistor string 322 and/or a third resistor string 323. According to some example embodiments, the first multiplexer 301 may be a 128:1 multiplexer.

A second multiplexer 302 may select any one of the plurality of intermediate voltages output from the first resistor string 321 and output the selected intermediate voltage as a 255th gamma voltage V255. According to some example embodiments, the second multiplexer 302 may be a 512:1 multiplexer.

The second resistor string 322 may receive the intermediate voltage (for example, the 0th gamma voltage V0) selected from the first multiplexer 301 and an eleventh gamma voltage V11, and may generate intermediate voltages between the 0th gamma voltage V0 and the eleventh gamma voltage V11.

A third multiplexer 303 may select any one of a plurality of intermediate voltages output from the second resistor string 322 and output the selected intermediate voltage as a third gamma voltage V3. According to some example embodiments, the third multiplexer 303 may be a 256:1 multiplexer.

The third resistor string 323 may receive the intermediate voltage (for example, the 0th gamma voltage V0) selected from the first multiplexer 301 and may generate intermediate voltages between the 0th gamma voltage V0 and a ground level.

A fourth multiplexer 304 may select any one of a plurality of intermediate voltages output from the third resistor string 323 and output the selected intermediate voltage as a reference voltage VT. The fourth multiplexer 304 may be a reference voltage multiplexer. According to some example embodiments, the fourth multiplexer 304 may be a 16:1 multiplexer.

A fourth resistor string 324 may receive the reference voltage VT and a 23rd gamma voltage V23 and generate intermediate voltages between the reference voltage VT and the 23rd gamma voltage V23.

A fifth multiplexer 305 may select any one of a plurality of intermediate voltages output from the fourth resistor string 324 and output the selected intermediate voltage as the eleventh gamma voltage V11. According to some example embodiments, the fifth multiplexer 305 may be a 256:1 multiplexer.

A fifth resistor string 325 may receive the reference voltage VT and a 35th gamma voltage V35 and generate intermediate voltages between the reference voltage VT and the 35th gamma voltage V35.

A sixth multiplexer 306 may select any one of a plurality of intermediate voltages output from the fifth resistor string 325 and output the selected intermediate voltage as the 23rd gamma voltage V23. According to some example embodiments, the sixth multiplexer 306 may be a 256:1 multiplexer.

A sixth resistor string 326 may receive the reference voltage VT and a 51st gamma voltage V51 and generate intermediate voltages between the reference voltage VT and the 51st gamma voltage V51.

A seventh multiplexer 307 may select any one of a plurality of intermediate voltages output from the sixth resistor string 326 and output the selected intermediate voltage as the 35th gamma voltage V35. According to some example embodiments, the seventh multiplexer 307 may be a 256:1 multiplexer.

A seventh resistor string 327 may receive the reference voltage VT and an 87th gamma voltage V87 and generate intermediate voltages between the reference voltage VT and the 87th gamma voltage V87.

An eighth multiplexer 308 may select any one of a plurality of intermediate voltages output from the seventh resistor string 327 and output the selected intermediate voltage as the 51st gamma voltage V51. According to some example embodiments, the eighth multiplexer 308 may be a 256:1 multiplexer.

An eighth resistor string 328 may receive the reference voltage VT and a 151st gamma voltage V151 and generate intermediate voltages between the reference voltage VT and the 151st gamma voltage V151.

A ninth multiplexer 309 may select any one of a plurality of intermediate voltages output from the eighth resistor string 328 and output the selected intermediate voltage as the 87th gamma voltage V87. According to some example embodiments, the ninth multiplexer 309 may be a 256:1 multiplexer.

A ninth resistor string 329 may receive the reference voltage VT and a 203rd gamma voltage V203 and generate intermediate voltages between the reference voltage VT and the 203rd gamma voltage V203.

A tenth multiplexer 310 may select any one of a plurality of intermediate voltages output from the ninth resistor string 329 and output the selected intermediate voltage as the 151st gamma voltage V151. According to some example embodiments, the tenth multiplexer 310 may be a 256:1 multiplexer.

A tenth resistor string 330 may receive the reference voltage VT and the 255th gamma voltage V255 and generate intermediate voltages between the reference voltage VT and the 255th gamma voltage V255.

An eleventh multiplexer 311 may select any one of a plurality of intermediate voltages output from the tenth resistor string 330 and output the selected intermediate voltage as the 203rd gamma voltage V203. According to some example embodiments, the eleventh multiplexer 311 may be a 256:1 multiplexer.

In the drawing, the 0th gamma voltage V0, the third gamma voltage V3, the eleventh gamma voltage V11, the 23rd gamma voltage V23, the 35th gamma voltage V35, the 51st gamma voltage V51, the 87th gamma voltage V87, the 151st gamma voltage V151, the 203rd gamma voltage V203, and the 255th gamma voltage V255 are generated using the plurality of multiplexers 301 to 311, however, this is merely an example embodiment, and the number and a type of the gamma voltage may be changed, and thus, a multiplexer structure may also be changed.

An eleventh resistor string 331 may generate a larger number of gamma voltages V0 to V255 using the gamma voltages V0, V3, V11, V23, V35, V51, V87, V151, V203, and V255 supplied from the first to third and fifth to eleventh multiplexers 301 to 303 and 305 to 311.

For example, the eleventh resistor string 331 may interpolate the eleventh gamma voltage V11 and the 23rd gamma voltage V23 to generate twelfth to 22nd gamma voltages V12 to V22 positioned therebetween. In a manner described above, all remaining gamma voltages V0 to V255 may be generated.

Therefore, the gamma voltage generator 40 may supply the 0th to 255th gamma voltages V0 to V255 to the data driver 30 when the display device 1 is entirely driven.

Next, the gamma voltage generator 40 will be described based on that the display device 1 is driven in the partial driving method.

The first resistor string 321 may receive the second high reference voltage VREF_H2 from the second switch element SW2 and the second low reference voltage VREF_L2 from the first switch element SW1, and may generate intermediate voltages between the second high reference voltage VREF_H2 and the second low reference voltage VREF_L2.

The first multiplexer 301 may select any one of a plurality of intermediate voltages output from the first resistor string 321 and output the selected intermediate voltage. The first multiplexer 301 may output the selected intermediate voltage as a 0th gamma voltage V0', or may output the selected intermediate voltage to the second resistor string 322 and/or the third resistor string 323.

The second multiplexer 302 may select any one of the plurality of intermediate voltages output from the first resistor string 321 and output the selected intermediate voltage as a 255th gamma voltage V255'.

The second resistor string 322 may receive the intermediate voltage (for example, the 0th gamma voltage V0') selected from the first multiplexer 301 and an eleventh gamma voltage V11', and may generate intermediate voltages between the 0th gamma voltage V0' and the eleventh gamma voltage V11'.

The third multiplexer 303 may select any one of a plurality of intermediate voltages output from the second resistor string 322 and output the selected intermediate voltage as a third gamma voltage V3'.

The third resistor string 323 may receive the intermediate voltage (for example, the 0th gamma voltage V0') selected from the first multiplexer 301 and may generate intermediate voltages between the 0th gamma voltage V0' and a ground level.

The fourth multiplexer 304 may select any one of a plurality of intermediate voltages output from the third resistor string 323 and output the selected intermediate voltage as a reference voltage VT'. The fourth multiplexer 304 may be a reference voltage multiplexer.

The fourth resistor string 324 may receive the reference voltage VT' and a 23rd gamma voltage V23' and generate intermediate voltages between the reference voltage VT' and the 23rd gamma voltage V23'.

The fifth multiplexer 305 may select any one of a plurality of intermediate voltages output from the fourth resistor string 324 and output the selected intermediate voltage as the eleventh gamma voltage V11'.

The fifth resistor string 325 may receive the reference voltage VT' and a 35th gamma voltage V35' and generate intermediate voltages between the reference voltage VT' and the 35th gamma voltage V35'.

The sixth multiplexer 306 may select any one of a plurality of intermediate voltages output from the fifth resistor string 325 and output the selected intermediate voltage as the 23rd gamma voltage V23'.

The sixth resistor string 326 may receive the reference voltage VT' and a 51st gamma voltage V51' and generate intermediate voltages between the reference voltage VT' and the 51st gamma voltage V51'.

The seventh multiplexer 307 may select any one of a plurality of intermediate voltages output from the sixth resistor string 326 and output the selected intermediate voltage as the 35th gamma voltage V35'.

The seventh resistor string 327 may receive the reference voltage VT' and an 87th gamma voltage V87' and generate intermediate voltages between the reference voltage VT' and the 87th gamma voltage V87'.

The eighth multiplexer 308 may select any one of a plurality of intermediate voltages output from the seventh resistor string 327 and output the selected intermediate voltage as the 51st gamma voltage V51'.

The eighth resistor string 328 may receive the reference voltage VT' and a 151st gamma voltage V151' and generate intermediate voltages between the reference voltage VT' and the 151st gamma voltage V151'.

The ninth multiplexer 309 may select any one of a plurality of intermediate voltages output from the eighth resistor string 328 and output the selected intermediate voltage as the 87th gamma voltage V87'.

The ninth resistor string 329 may receive the reference voltage VT' and a 203rd gamma voltage V203' and generate intermediate voltages between the reference voltage VT' and the 203rd gamma voltage V203'.

The tenth multiplexer 310 may select any one of a plurality of intermediate voltages output from the ninth resistor string 329 and output the selected intermediate voltage as the 151st gamma voltage V151'.

The tenth resistor string 330 may receive the reference voltage VT' and the 255th gamma voltage V255' and generate intermediate voltages between the reference voltage VT' and the 255th gamma voltage V255'.

The eleventh multiplexer 311 may select any one of a plurality of intermediate voltages output from the tenth resistor string 330 and output the selected intermediate voltage as the 203rd gamma voltage V203'.

In the drawing, the 0th gamma voltage V0', the third gamma voltage V3', the eleventh gamma voltage V11', the 23rd gamma voltage V23', the 35th gamma voltage V35', the 51st gamma voltage V51', the 87th gamma voltage V87', the 151st gamma voltage V151', the 203rd gamma voltage V203', and the 255th gamma voltage V255' are generated using the plurality of multiplexers 301 to 311, however, this is merely an example embodiment, and the number and a type of the gamma voltage may be changed, and thus, a multiplexer structure may also be changed.

The eleventh resistor string 331 may generate a larger number of gamma voltages V0' to V255' using the gamma voltages V0', V3', V11', V23', V35', V51', V87', V151', V203', and V255' supplied from the first to third and fifth to eleventh multiplexers 301 to 303 and 305 to 311.

Therefore, the gamma voltage generator 40 may supply the 0th to 255th gamma voltages V0' to V255' to the data driver 30 when the display device 1 is partially driven.

According to some example embodiments, the 0th to 255th gamma voltages V0 to V255 output by the gamma voltage generator 40 when the display device 1 is entirely driven and 0th to 255th gamma voltages V0' to V255' output when the display device 1 is partially driven may be different.

According to some example embodiments, when the display device 1 is entirely driven, the data driver 30 may receive the 0th to 255th gamma voltages V0 to V255 from the gamma voltage generator 40, and may provide the data voltage to the pixels PX comprised in the first pixel unit 51 and the second pixel unit 52. When the display device 1 is partially driven, the data driver 30 may receive the 0th to 255th gamma voltages V0' to V255' from the gamma voltage generator 40, and may provide the data voltage to the pixels PX comprised in the first pixel unit 51.

That is, the pixels PX comprised in the first pixel unit 51 may receive data voltages based on different gamma voltages according to whether the display device 1 is entirely driven or is partially driven when expressing the same grayscale.

Therefore, when the display device 1 is partially driven, an increase of a luminance based on the pixels PX comprised in the first pixel unit 51 may be suppressed. Accordingly, even when the display device 1 changes the driving method from the partial driving to the entire driving, recognition of a boundary (that is, a boundary between the first foldable area FODA1 and the second flat area FLDA2) between the first pixel unit 51 and the second pixel unit 52 due to a luminance difference to the user may be minimized, even due to a luminance change caused by a loading effect of the pixels PX comprised in the first pixel unit 51 and the second pixel unit 52, or a difference of a deterioration amount according to a use time.

Next, a display device according to another embodiment will be described. Hereinafter, the same component on the drawings as in FIGS. 1 to 5 will be omitted, and the same or similar reference numerals are used.

Figure 6:
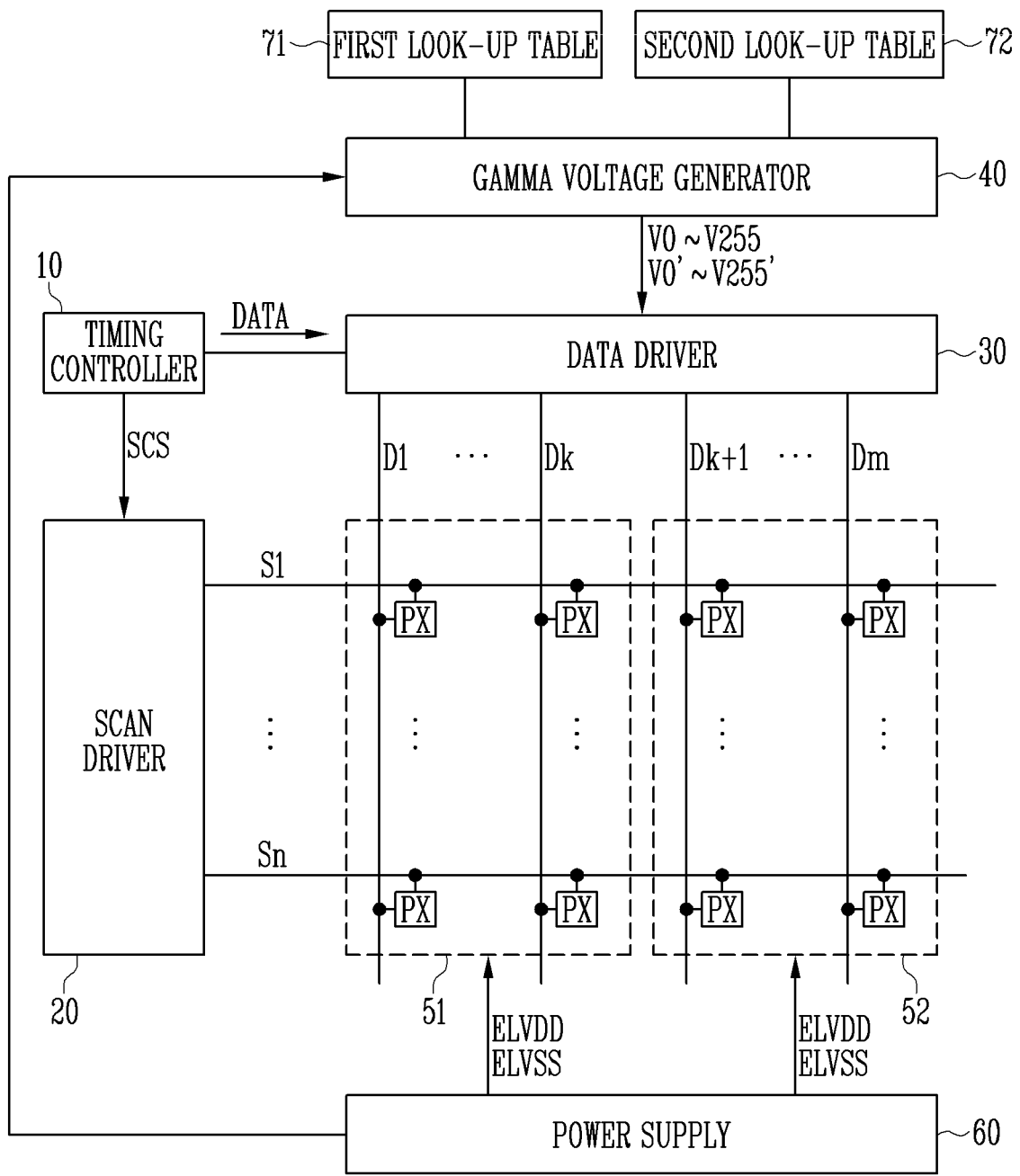
FIG. 6 is a block diagram schematically illustrating a display device according to some example embodiments of the present disclosure.
Figure 7:
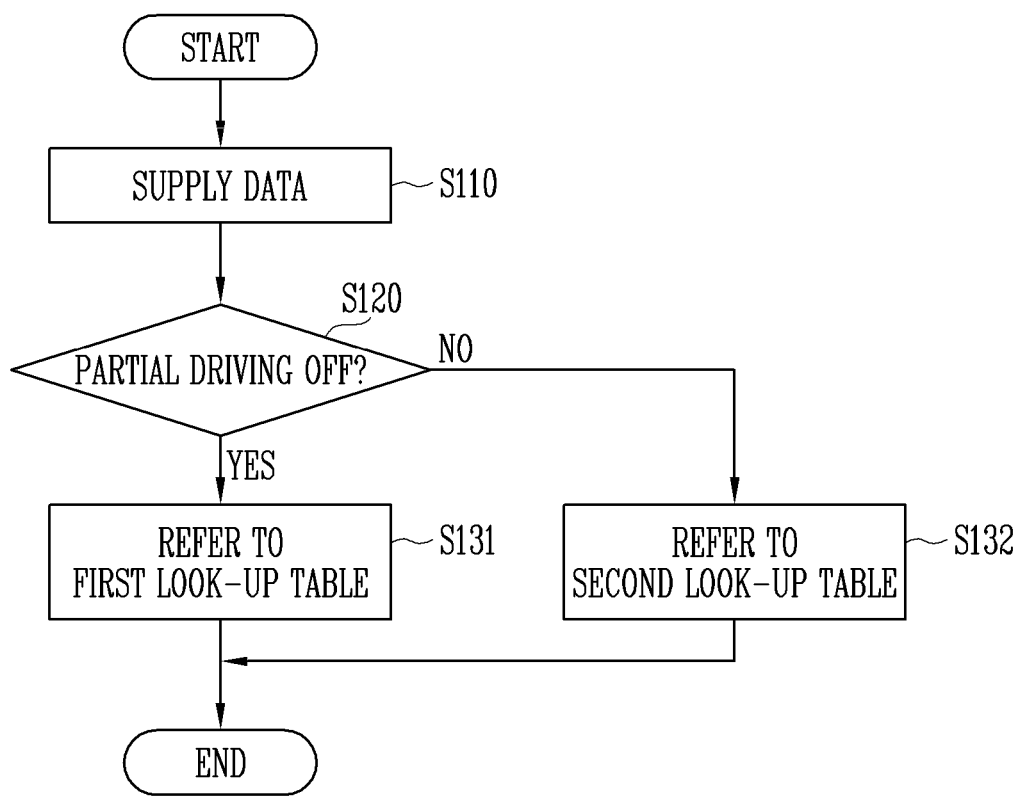
FIG. 7 is an algorithm flowchart illustrating a method of driving the display device of FIG. 6.

FIG. 6 is a block diagram schematically illustrating the display device according to another embodiment of the disclosure. FIG. 7 is an algorithm flowchart illustrating a method of driving the display device of FIG. 6.

Referring to FIG. 6, the display device 2 according to the present embodiment has a different in that the display device 2 further comprises a first look-up table 71 and a second look-up table 72 connected to the gamma voltage generator 40, compared to the display device 1 according to the embodiment of FIG. 3.

In the first look-up table 71, a plurality of life values for each pixel and compensation grayscales respectively corresponding to display grayscales that may be implemented by the display unit when the display device 2 is entirely driven may be set.

In the second look-up table 72, the plurality of life values for each pixel and the compensation grayscales respectively corresponding to the display grayscales that may be implemented by the display unit when the display device 2 is partially driven may be set.

According to some example embodiments, when the display device 2 is entirely driven, the gamma voltage generator 40 may determine a compensation grayscale value by referring to the first look-up table 71, and may provide the gamma voltages V0 to V255 to the data driver 30. When the display device 2 is partially driven, the gamma voltage generator 40 may determine the compensation grayscale value by referring to the second look-up table 72, and may provide the gamma voltages V0' to V255' to the data driver 30.

According to some example embodiments, the gamma voltages V0 to V255 output by the gamma voltage generator 40 when the display device 2 is entirely driven and the gamma voltages V0' to V255' output when the display device 2 is partially driven may be different.

According to some example embodiments, when the display device 2 is entirely driven, the data driver 30 may receive the gamma voltages V0 to V255 from the gamma voltage generator 40, and may provide the data voltage to the pixels PX comprised in the first pixel unit 51 and the second pixel unit 52. When the display device 2 is partially driven, the data driver 30 may receive the gamma voltages V0' to V255' from the gamma voltage generator 40, and may provide the data voltage to the pixels PX comprised in the first pixel unit 51.

That is, the pixels PX comprised in the first pixel unit 51 may receive data voltages based on different gamma voltages according to whether the display device 2 is entirely driven or is partially driven when expressing the same grayscale.

Therefore, when the display device 2 is partially driven, an increase of a luminance by a luminance during the entire driving based on the pixels PX comprised in the first pixel unit 51 may be suppressed. Accordingly, even when the display device 2 changes the driving method from the partial driving to the entire driving, recognition of the boundary between the first pixel unit 51 and the second pixel unit 52 due to the luminance difference to the user may be minimized, even due to the luminance change caused by the loading effect of the pixels PX comprised in the first pixel unit 51 and the second pixel unit 52, or the difference of the deterioration amount according to the use time.

Referring to FIG. 7, according to some example embodiments, the method of driving the display device 2 may comprise a 'step of supplying a data value (S110)', a 'step of checking whether the driving method is the partial driving (S120)', a 'step of referring to the first look-up table (S131)' and a 'step of referring to the second look-up table (S132)'. In the present specification, each step is sequentially performed according to an algorithm flowchart. However, it is obvious that some steps shown as being performed in succession may be simultaneously performed, some steps may be omitted, or another step may be further comprised between each step unless the spirit of the disclosure is changed.

The 'step of supplying the data value (S110)' corresponds to a step in which the timing controller 10 provides the data values DATA for each frame to the data driver 30.

The 'step of checking whether the driving method is the partial driving' corresponds to a step of checking whether the display device 2 is driven in the partial driving method or in the entire driving method. For example, the 'step S120 of checking whether the driving method is the partial driving' may be performed through an AP or a DDI.

The 'step of referring to the first look-up table (S131)' corresponds to a step in which the gamma voltage generator 40 generates the gamma voltages V0 to V255 by referring to the first look-up table 71 when it is determined that the display device 2 is driven in the entire driving method (the partial driving is turned off).

The 'step of referring to the second look-up table (S132)' corresponds to a step in which the gamma voltage generator 40 generates the gamma voltages V0' to V255' by referring to the second look-up table 72 when it is determined that the display device 2 is driven in the partial driving method (the partial driving is turned on).

Figure 8:
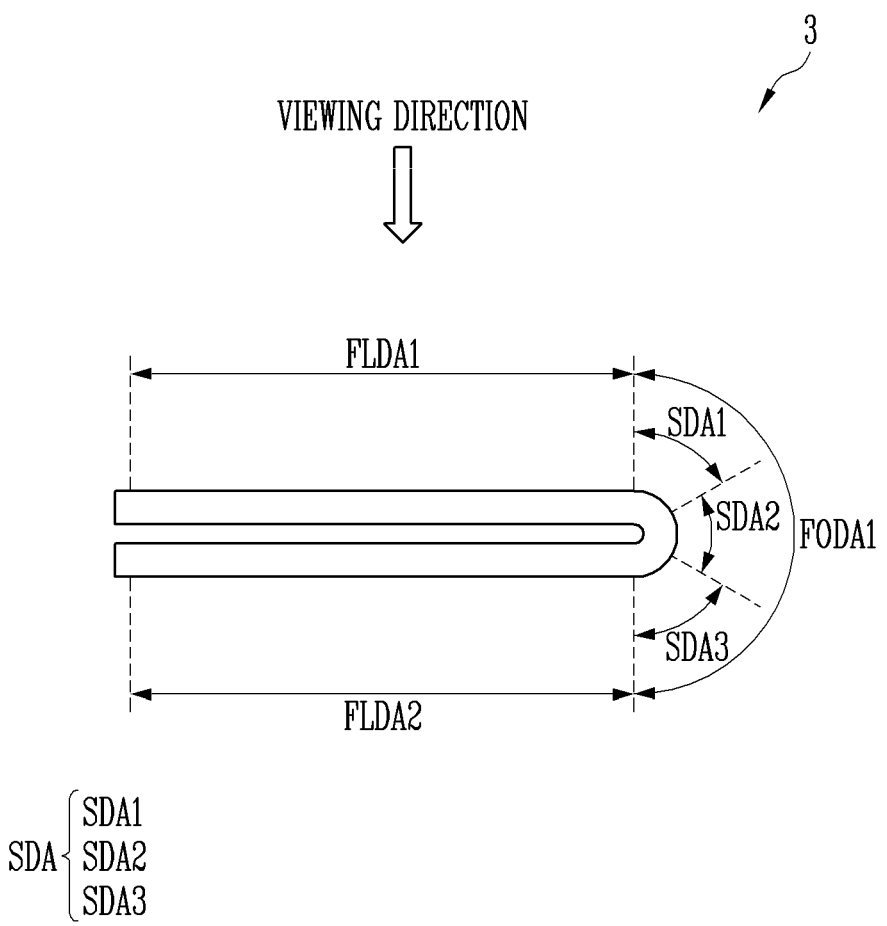
FIG. 8 is a side view schematically illustrating a display device according to some example embodiments of the present disclosure.
Figure 9:
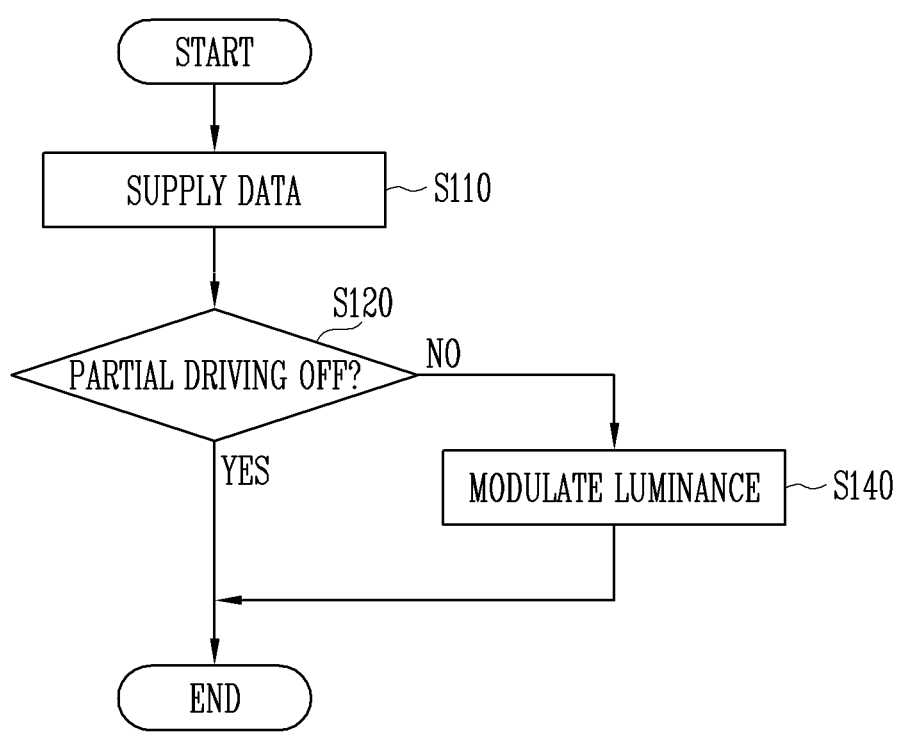
FIG. 9 is an algorithm flowchart illustrating a method of driving the display device according to some example embodiments of the present disclosure.

FIG. 8 is a side view schematically illustrating a display device according to still another embodiment of the disclosure. FIG. 9 is an algorithm flowchart illustrating a method of driving the display device. FIG. 8 shows a side view of the display device 3 in a virtual bending axis direction in a state in which the display device 3 is completely out-folded.

Referring to FIG. 8, the display device 3 according to the present embodiment is different from the display device 1 according to FIGS. 1 and 2 in that the display device 3 comprises a plurality of sub areas having different luminance when the first foldable area FODA1 is partially driven.

The contents in which the pixels PX comprised in the first pixel unit 51 receive different data voltages based on the different gamma voltages according to whether the display device 3 is driven in the entire driving method or is driven in the partial driving method described with reference to FIGS. 3 to 7 may be applied to the present embodiment, but embodiments according to the present disclosure are not limited thereto.

The present embodiment is described on the basis that a user's viewing direction faces the first flat area FLDA1 in a state in which the display device 3 is out-folded.

According to some example embodiments, the first foldable area FODA1 may comprise a first sub area SDA1 adjacent to the first flat area FLDA1, a third sub area SDA3 adjacent to the second flat area FLDA2, and a third sub area SDA3 located between the first sub area SDA1 and the second sub area SDA2. The first flat area FLDA1, the first sub area SDA1, the second sub area SDA2, the third sub area SDA3, and the second flat area FLDA2 may be positioned to be connected. For convenience of description, the first foldable area FODA1 is divided into three sub areas SDA1, SDA2, and SDA3, but the present embodiment is not limited thereto. According to some example embodiments, the first foldable area FODA1 may be divided into two sub areas or four or more sub areas.

When the display device 3 is entirely driven, each of pixels PX positioned in the first sub area SDA1, the second sub area SDA2, and the third sub area SDA3 may be set to have the same luminance in correspondence with a data voltage of the same grayscale. According to some example embodiments, the pixels PX positioned in the first flat area FLDA1, the first sub area SDA1, the second sub area SDA2, the third sub area SDA3, and the second flat area FLDA2 may be set to have the same luminance when the display device 3 is entirely driven or in a state in which the display device 3 is unfolded (un-folding state).

For example, when the display device 3 is entirely driven, each red pixel, green pixel, and blue pixel positioned in the first flat area FLDA1, the first sub area SDA1, the second sub area SDA2, the third sub area SDA3, and the second flat area FLDA2 may be set as [Table 1] below.

TABLE 1

|  | FLDA1 | SDA1 | SDA2 | SDA3 | FLDA2 |
| --- | --- | --- | --- | --- | --- |
| Red pixel | 128 | 128 | 128 | 128 | 128 |
| Green pixel | 128 | 128 | 128 | 128 | 128 |
| Blue pixel | 128 | 128 | 128 | 128 | 128 |

Here, each value of [Table 1] is based on a gray scale. When the display device 3 is partially driven, each pixel PX positioned in the first sub area SDA1, the second sub area SDA2, and the third sub area SDA3 is set to express the same grayscale, but may be set to have different luminance. According to some example embodiments, the pixels PX positioned in the first flat area FLDA1, the first sub area SDA1, the second sub area SDA2, the third sub area SDA3, and the second flat area FLDA2 may be set to have different luminance when the display device 3 is entirely driven or in a state in which the display device 3 is unfolded (out-folding state).

According to some example embodiments, when the display device 3 is partially driven, the pixels PX may be set so that the luminance gradually decreases in a sequence of the pixels PX comprised in the first sub area SDA1, the second sub area SDA2, and the third sub area SDA3 in correspondence with the same grayscale. For example, when the display device 3 is partially driven, each red pixel, green pixel, and blue pixel positioned in the first flat area FLDA1, the first sub area SDA1, the second sub area SDA2, the third sub area SDA3, and the second flat area FLDA2 may be set as [Table 2] below.

TABLE 2

|  | FLDA1 | SDA1 | SDA2 | SDA3 | FLDA2 |
|---|---|---|---|---|---|
| Red pixel | 128 | 118 | 108 | 98 | 0 |
| Green pixel | 128 | 118 | 108 | 98 | 0 |
| Blue pixel | 128 | 118 | 108 | 98 | 0 |

Here, each value of [Table 2] is based on a gray scale. According to some example embodiments, when the display device 3 is partially driven, the pixels PX of the first sub area SDA1 may be set to have the same luminance as the pixels PX of the first flat area FLDA1, the pixels PX of the third sub area SDA3 may be set to have the same luminance as the pixels PX of the second flat area FLDA2, and the pixels PX of the second sub area SDA2 may be set to have a luminance between the pixels PX of the first sub area SDA1 and the pixels PX of the third sub area SDA3.

Referring to FIG. 9, according to some example embodiments, the method of driving the display device 3 may comprise the 'step of supplying the data value (S110)', the 'step of checking whether the driving method is the partial driving (S120)', and a 'luminance modulation step (S140)'.

The 'luminance modulation step (S140)' corresponds to a step in which each of pixels PX positioned in the first sub area SDA1, the second sub area SDA2, and the third sub area SDA3 are driven to have different luminance in correspondence with the data voltage of the same grayscale when it is determined that the display device 3 is driven in the partial driving method (partial driving is turned on).

According to some example embodiments, when the display device 3 is partially driven, an afterimage or the like that may occur at each boundary between the first flat area FLDA1, the first sub area SDA1, the second sub area SDA2, the third sub area SDA3, and the second flat area FLDA2 may be dispersed.

Figure 10:
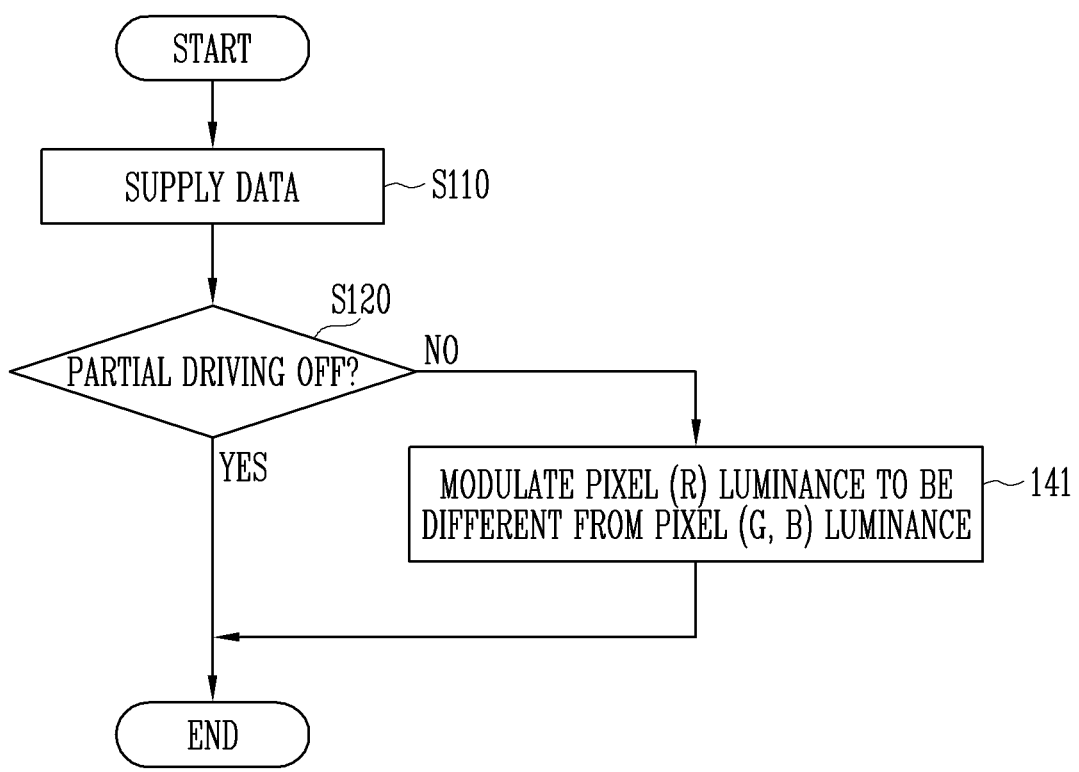
FIG. 10 is an algorithm flowchart illustrating a method of driving the display device according to some example embodiments of the present disclosure.

FIG. 10 is an algorithm flowchart illustrating a method of driving the display device according to still another embodiment of the disclosure. FIG. 10 corresponds to a modification example of FIG. 9.

According to some example embodiments, the 'luminance modulation step (S140)' of FIG. 9 is modified to a 'luminance modulation step of the red pixel (S141)'. The 'luminance modulation step of the red pixel (S141)' corresponds to a step in which each of pixels PX positioned in the first sub area SDA1, the second sub area SDA2, and the third sub area SDA3 are driven to have different luminance, and the red pixel in each sub area is driven to have a luminance different from that of the green pixel and the blue pixel when it is determined that the display device 3 is driven in the partial driving method (partial driving is turned on).

According to some example embodiments, when the display device 3 is entirely driven, each red pixel, green pixel, and blue pixel positioned in the first flat area FLDA1, the first sub area SDA1, the second sub area SDA2, the third sub area SDA3, and the second flat area FLDA2 may be set as [Table 1] described above.

Meanwhile, when the display device 3 is partially driven, each pixel PX positioned in the first sub area SDA1, the second sub area SDA2, and the third sub area SDA3 is set to express the same grayscale, but may be set to have different luminance, and may be set to have different luminance for each color pixel. For example, when the display device 3 is partially driven, each red pixel, green pixel, and blue pixel positioned in the first flat area FLDA1, the first sub area SDA1, the second sub area SDA2, the third sub area SDA3, and the second flat area FLDA2 may be set as [Table 3] below.

TABLE 3

|  | FLDA1 | SDA1 | SDA2 | SDA3 | FLDA2 |
|---|---|---|---|---|---|
| Red pixel | 128 | 118 | 108 | 98 | 0 |
| Green pixel | 128 | 118 | 108 | 98 | 0 |
| Blue pixel | 128 | 118 | 108 | 98 | 0 |

Here, each value of [Table 3] is based on a gray scale. A luminance recognized by the user may be different from a luminance set in the display device 3 for each color. For example, even though the red pixel, the green pixel, and the blue pixel are set as the same luminance in the display device 3, the user may recognize red light emitted from the red pixel darker than green light and blue light emitted from the green pixel and the blue pixel.

According to some example embodiments, when the red pixel is set to a luminance higher than that of the green pixel and the blue pixel in each sub area, a color difference (WAD) according to the viewing direction and an angle of each sub area may be improved and may be recognized to the user.

Figure 11:
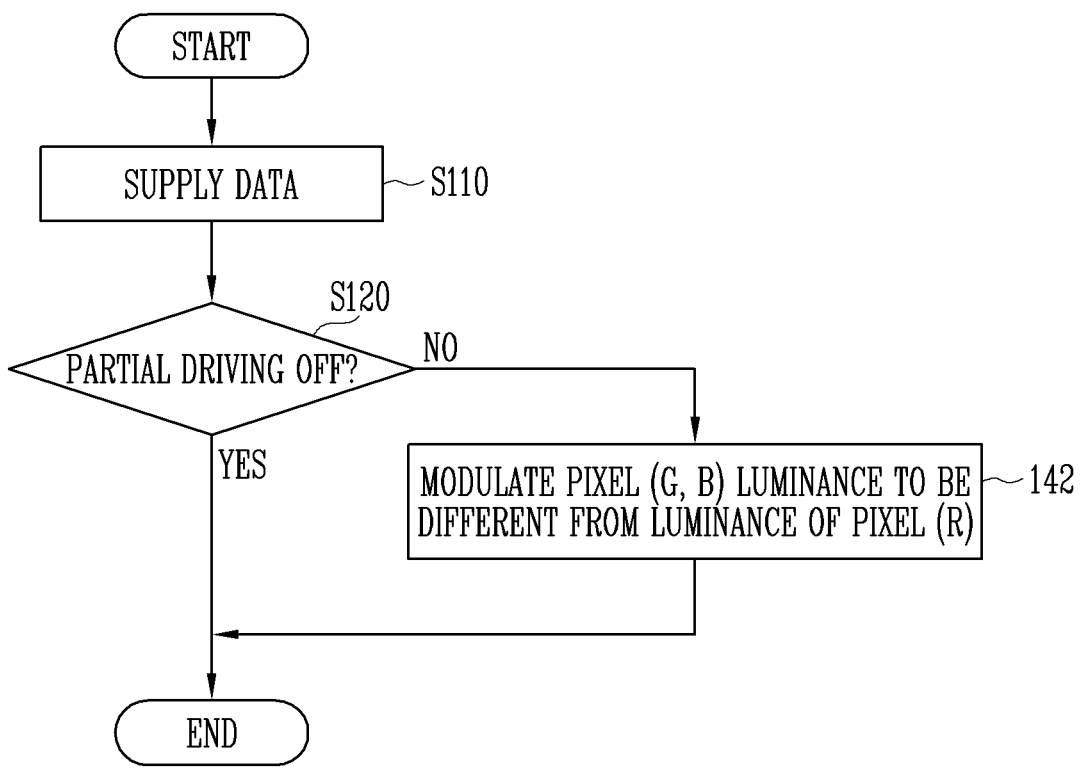
FIG. 11 is an algorithm flowchart illustrating another method of driving the display device according to some example embodiments of the present disclosure.

FIG. 11 is an algorithm flowchart illustrating another method of driving the display device according to still another embodiment of the disclosure.

According to some example embodiments, the 'luminance modulation step (S140)' of FIG. 9 is modified to a 'luminance modulation step of the green pixel and the blue pixel (S142)'. The 'luminance modulation step of the green pixel and the blue pixel (S142)' corresponds to a step in which each of pixels PX positioned in the first sub area SDA1, the second sub area SDA2, and the third sub area SDA3 are set to have the same grayscale, are driven to have different luminance, and the green pixel and the blue pixel in each sub area is driven to have a luminance different from that of the red pixel when it is determined that the display device 3 is driven in the partial driving method (partial driving is turned on).

According to some example embodiments, when the display device 3 is entirely driven, each red pixel, green pixel, and blue pixel positioned in the first flat area FLDA1, the first sub area SDA1, the second sub area SDA2, the third sub area SDA3, and the second flat area FLDA2 may be set as [Table 1] described above.

Meanwhile, when the display device 3 is partially driven, each pixel PX positioned in the first sub area SDA1, the second sub area SDA2, and the third sub area SDA3 is set to express the same grayscale, but may be set to have different luminance, and may be set to have different luminance for each color pixel. For example, when the display device 3 is partially driven, each red pixel, green pixel, and blue pixel positioned in the first flat area FLDA1, the first sub area SDA1, the second sub area SDA2, the third sub area SDA3, and the second flat area FLDA2 may be set as [Table 4] below.

TABLE 4

|  | FLDA1 | SDA1 | SDA2 | SDA3 | FLDA2 |
|---|---|---|---|---|---|
| Red pixel | 128 | 118 | 108 | 98 | 0 |
| Green pixel | 128 | 113 | 103 | 93 | 0 |
| Blue pixel | 128 | 113 | 103 | 93 | 0 |

Here, each value of [Table 4] is based on a gray scale. As another example, when the display device 3 is partially driven, each red pixel, green pixel, and blue pixel positioned in the first flat area FLDA1, the first sub area SDA1, the second sub area SDA2, the third sub area SDA3, and the second flat area FLDA2 may be set as [Table 5] below. In [Table 5], the green pixel and the blue pixel may also be driven to respective have difference luminance differently from [Table 4].

TABLE 5

|  | FLDA1 | SDA1 | SDA2 | SDA3 | FLDA2 |
|---|---|---|---|---|---|
| Red pixel | 128 | 118 | 108 | 98 | 0 |
| Green pixel | 128 | 113 | 103 | 93 | 0 |
| Blue pixel | 128 | 113 | 98 | 88 | 0 |

Here, each value of [Table 5] is based on a gray scale. As the present, when the green pixel and the blue pixel are set to a luminance lower than that of the red pixel in each sub area, a color difference (WAD) according to the viewing direction and an angle of each sub area may be improved and may be recognized to the user.

Each of values described in [Table 1] to [Table 5] described above as an example is merely an example. Each of values described in [Table 1] to [Table 5] may be variously modified within a limit without changing the spirit of the disclosure according to an embodiment of the disclosure.

Figure 12:
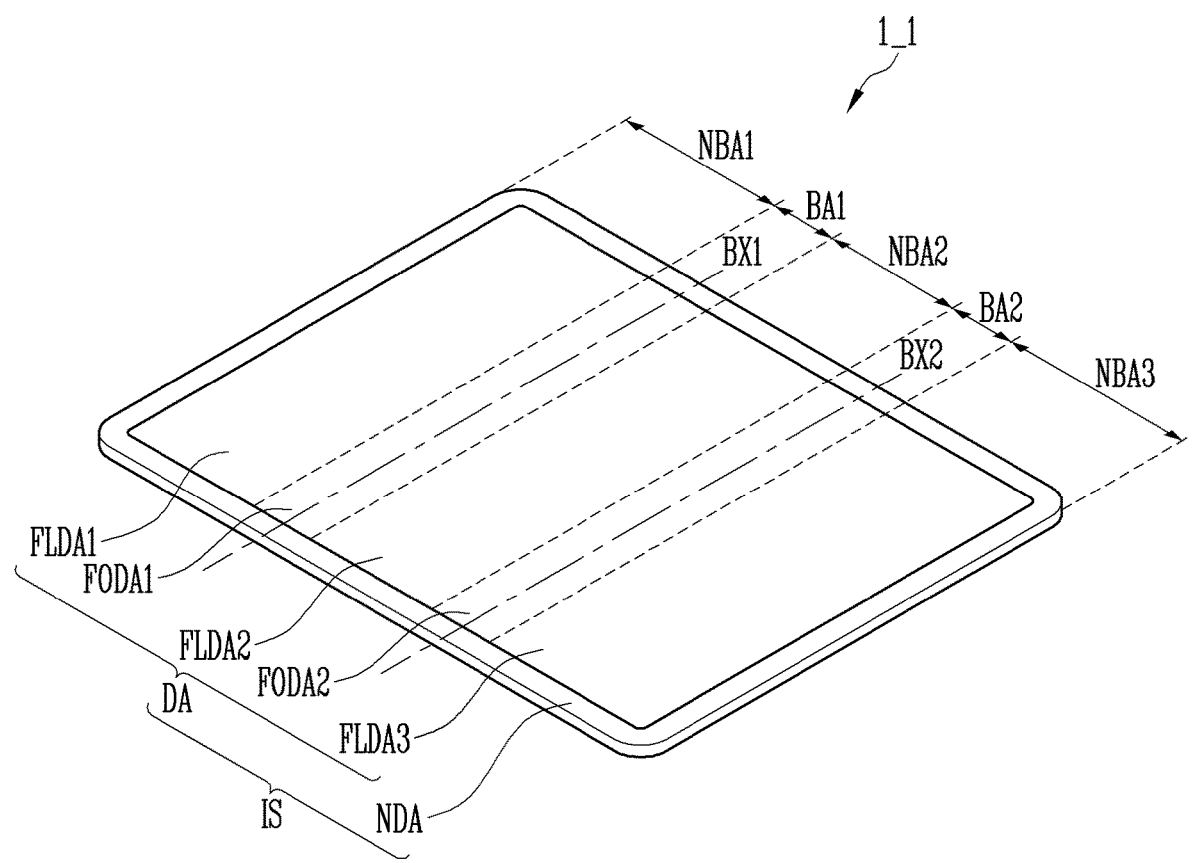
FIG. 12 is a perspective view illustrating one state of a display device according to some example embodiments of the present disclosure.
Figure 13:
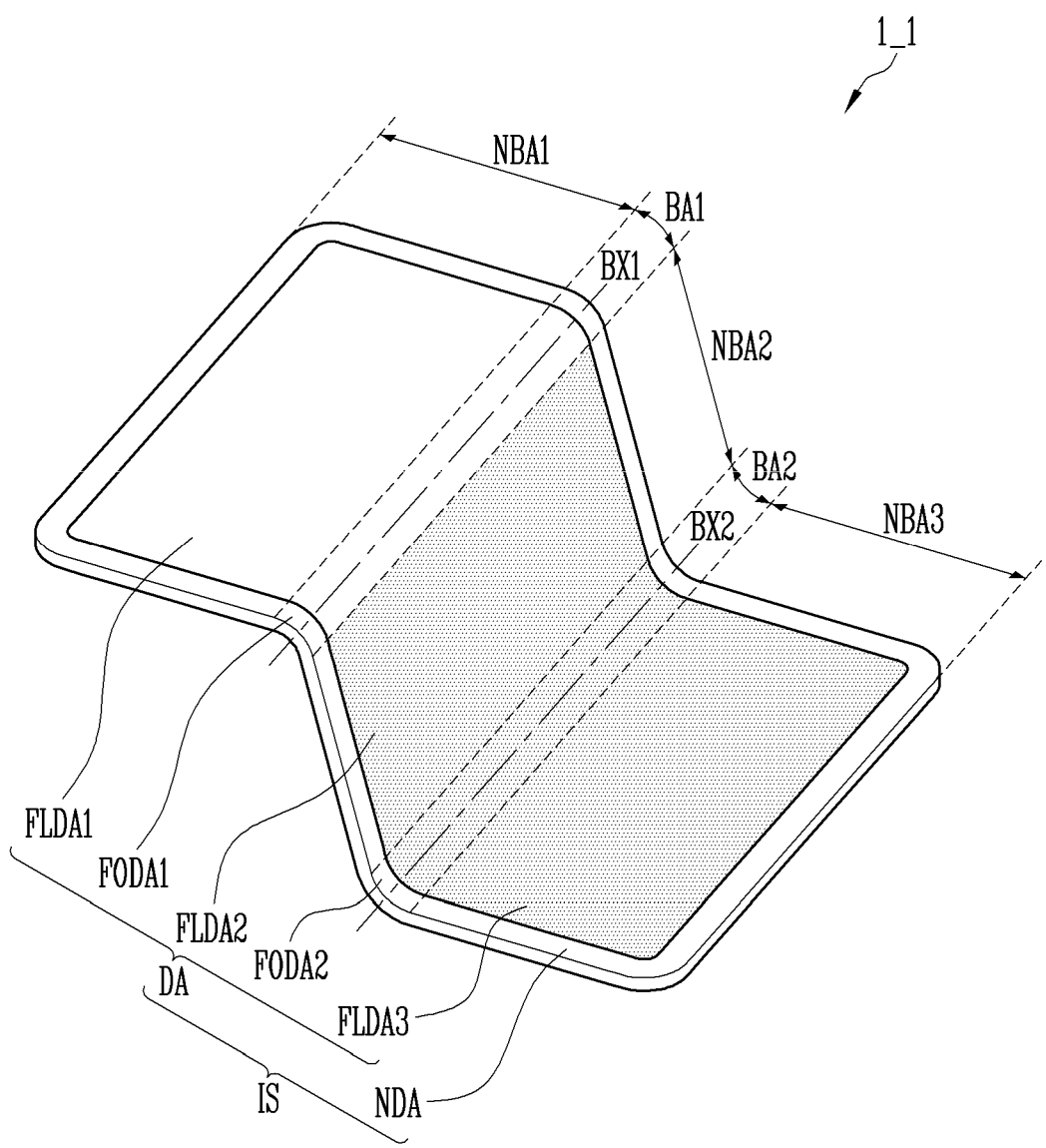
FIG. 13 is a perspective view illustrating another state of the display device of FIG. 12.

FIG. 12 is a perspective view illustrating one state of a display device according to still another embodiment of the disclosure. FIG. 13 is a perspective view illustrating another state of the display device of FIG. 12.

Referring to FIGS. 12 and 13, the display device 1_1 according to the present embodiment may be out-folded so that some areas of the display surface IS go outward in a bent state, and may be in-folded so that some other areas of the display surface IS go inward.

According to some example embodiments, a first non-bending area NBA1 and a second non-bending area NBA2 may be positioned with a first bending area BA1 interposed therebetween, and the second non-bending area NBA2 and a third non-bending area NBA3 may be positioned with the second bending area BA2 interposed therebetween. In the display device 1_1, the two bending areas BA1 and BA2 and the three non-bending areas NBA1, NBA2, and NBA3 may be connected and positioned.

The first non-bending area NBA1 and the second non-bending area NBA2 may be out-folded on the basis of a first virtual bending axis BX1, and the second non-bending area NBA2 and the third non-bending area NBA3 may be in-folded on the basis of a second virtual bending axis BX2.

The display area DA may comprise a first flat area FLDA1 positioned in the first non-bending area NBA1, a first foldable area FODA1 positioned in the first bending area BA1, a second flat area FLDA2 positioned in the second non-bending area NBA2, a second foldable area FODA2 positioned in the second bending area BA2, and a third flat area FLDA3 positioned in the third non-bending area NBA3.

When the display device 1_1 is entirely driven, all pixels comprised in the first flat area FLDA1, the first foldable area FODA1, the second flat area FLDA2, the second foldable area FODA2, and the third flat area FLDA3 may be driven, and when the display device 1_1 is partially driven, only pixels PX comprised in the first flat area FLDA1 and the first foldable area FODA1 may be driven.

The driving method described with reference to FIGS. 3 to 11 may also be applied to the display device 1_1 according to the present embodiment.

Figure 14:
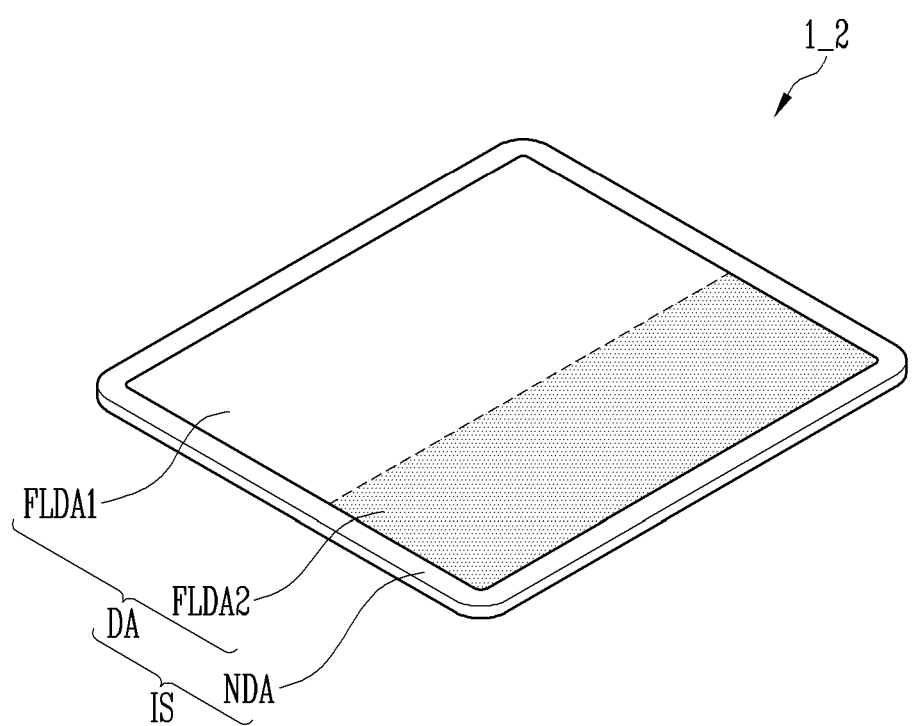
FIG. 14 is a perspective view illustrating one state of a display device according to some example embodiments of the present disclosure.

FIG. 14 is a perspective view illustrating one state of a display device according to still another embodiment of the disclosure.

Referring to FIG. 14, the display device 1_2 according to the present embodiment may be rigid.

According to some example embodiments, the display area DA may comprise a first flat area FLDA1 and a second flat area FLDA2. When the display device 1 is entirely driven, all pixels PX comprised in the first flat area FLDA1 and the second flat area FLDA2 may be driven, and when the display device 1 is partially driven, only pixels PX comprised in the first flat area FLDA1 may be driven.

The driving method described with reference to FIGS. 3 to 7 may also be applied to the display device 1 according to some example embodiments.

Although aspects of some example embodiments of the present disclosure have been described with reference to the accompanying drawings, it will be understood by those skilled in the art to which the disclosure pertains that the embodiments may be implemented in other specific forms without changing the technical spirit and essential features of the disclosure. Therefore, it should be understood that the example embodiments described above are illustrative and are not restrictive in all aspects.

What is claimed is:

1. A display device comprising:
a plurality of pixels;
a first pixel unit comprising a first portion of the plurality of pixels;
a second pixel unit comprising a second portion of the plurality of pixels; and
a data driver configured to supply data voltages to the first pixel unit and the second pixel unit, corresponding ones of the data voltages supplied to the first pixel unit being based on different gamma voltages depending on a selected driving method, the different gamma voltages corresponding to a same expressed grayscale such that respective luminances of different ones of the pixels of the first pixel unit are differently modulated in a partial driving mode, and
wherein the second pixel unit is configured to be driven or not driven according to the driving method.

2. The display device according to claim 1, wherein the corresponding ones of the data voltages supplied to the first pixel unit are generated based on the gamma voltages that are different depending on whether the second pixel unit is driven.

3. The display device according to claim 1, wherein the driving method comprises:
an entire driving mode during which both of the first pixel unit and the second pixel unit are driven; and
a partial driving mode during which the first pixel unit is driven and the second pixel unit is not driven.

4. The display device according to claim 3, wherein the display device is a foldable display device, and
wherein the display device is configured to operate in the entire driving mode in response to the display device being in an un-folding state, and is configured to operate in the partial driving mode in response to the display device being in a folding state.

5. The display device according to claim 4, wherein the display device comprises a bending area configured to be bent in the folding state, and a first non-bending area and a second non-bending area that are not configured to be bent, with the bending area interposed between the first non-bending area and the second non-bending area.

6. The display device according to claim 5, wherein the first pixel unit comprises a plurality of first pixels located in the first non-bending area, and
wherein the second pixel unit comprises a plurality of second pixels located in the second non-bending area.

7. The display device according to claim 6, wherein the first pixel unit further comprises a plurality of third pixels located in the bending area.

8. The display device according to claim 1, further comprising:
a gamma voltage generator configured to provide the gamma voltages to the data driver; and
a power supply configured to provide a plurality of voltage signals to the gamma voltage generator.

9. The display device according to claim 8, further comprising:
a first switch element connected between the power supply and one input terminal of the gamma voltage generator; and
a second switch element connected between the power supply and another input terminal of the gamma voltage generator.

10. The display device according to claim 9, wherein the first switch element is configured to selectively provide a first high reference voltage or a second high reference voltage to the gamma voltage generator from the power supply,
wherein the second switch element is configured to selectively provide a first low reference voltage or a second low reference voltage to the gamma voltage generator from the power supply, and
wherein the gamma voltage generator is configured to output either a gamma voltage having a voltage between the first high reference voltage and the first low reference voltage, or a gamma voltage having a voltage between the second high reference voltage and the second low reference voltage, according to the driving method.

11. The display device according to claim 10, wherein the gamma voltage generator is configured to output the gamma voltage having the voltage between the first high reference voltage and the first low reference voltage in response to the second pixel unit being driven, and to output the gamma voltage having the voltage between the second high reference voltage and the second low reference voltage in response to the second pixel unit not being driven,
wherein the second high reference voltage is different from the first high reference voltage, and
wherein the second low reference voltage is different from the first low reference voltage.

12. The display device according to claim 8, further comprising a first look-up table and a second look-up table in which a compensation grayscale is set,
wherein the gamma voltage generator is configured to generate the gamma voltages by referring to the first look-up table or the second look-up table according to the driving method.

13. The display device according to claim 12, wherein the gamma voltage generator is configured to generate the gamma voltages by referring to the first look-up table in response to the second pixel unit being driven, and to generate the gamma voltages by referring to the second look-up table in response to the second pixel unit not being driven.

14. The display device according to claim 1, wherein the display device comprises a display area configured to display an image, and a non-display area that is not configured to display images,
wherein the display area comprises a foldable area in a bent area, and a first flat area and a second flat area that are not configured to be bent, with the foldable area interposed between the first flat area and the second flat area, and
wherein the foldable area comprises a plurality of sub areas in which a luminance of pixels set to express a same grayscale is differently set according to the driving method.

15. The display device according to claim 14, wherein pixels of different colors are positioned in one sub area among the plurality of sub areas, and
wherein the pixels of the different colors comprise pixels in which a luminance is differently set.

16. A foldable display device comprising:
a first pixel unit configured to be driven in both an un-folding state and a folding state;
a second pixel unit configured to be driven in the un-folding state and to be not driven in the folding state; and
a data driver configured to provide data voltages to the first pixel unit and the second pixel unit,
wherein the data driver is configured to generate corresponding ones of the data voltages to the first pixel unit based on gamma voltages that are differently modulated depending on whether the first pixel unit is in the un-folding state or the folding state.

17. The foldable display device according to claim 16, wherein the data driver is configured to provide respective ones of the data voltages to the second pixel unit in the un-folding state, and is configured to not provide any of the data voltages to the second pixel unit in the folding state.

18. The foldable display device according to claim 16, further comprising a gamma voltage generator configured to generate the gamma voltages provided to the data driver,
wherein the gamma voltage generator is configured to generate the gamma voltages by receiving a reference voltage that is different according to the un-folding state or the folding state.

19. A display device comprising:
a bending area configured to be bent in a folded state, and a first non-bending area and a second non-bending area that are not configured to be bent, with the bending area interposed between the first non-bending area and the second non-bending area:
a first pixel unit configured to be driven in both an un-folding state and the folding state; and
a second pixel unit configured to be driven in the un-folding state, and configured to be not driven in the folding state,
wherein the first pixel unit comprises a plurality of pixels in the bending area, and
wherein a luminance of the plurality of pixels is differently set due to being differently modulated depending on whether the bending area is bent in the folding state.

20. The display device according to claim 19, wherein the plurality of pixels comprise a first color pixel and a second color pixel, and wherein the luminance of the first color pixel and the second color pixel is differently set in the folding state.

\* \* \* \* \*